Figure 1:
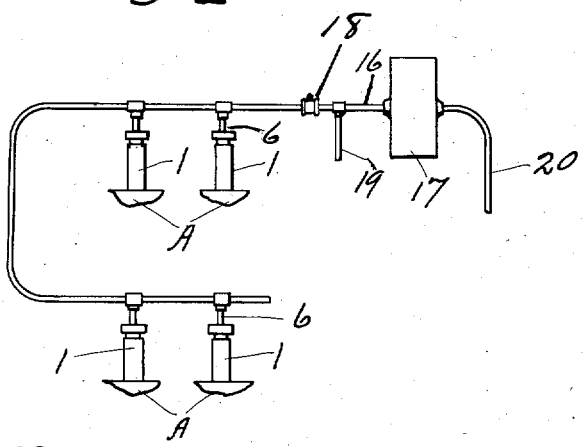

June 14, 1927. Re. 16,655

G. L. MOORE

LUBRICATING SYSTEM

Original Filed Dec. 10, 1925

INVENTOR.

BY

Witness

Reissued June 14, 1927. Re. 16,655

UNITED STATES PATENT OFFICE.

GEORGE L. MOORE, OF CHICAGO, ILLINOIS.

LUBRICATING SYSTEM.

Original No. 1,587,849, dated June 8, 1926, Serial No. 74,432, filed December 10, 1925. Application for reissue filed April 2, 1927. Serial No. 180,601.

In many places, on automobiles for example, there are many bearings that must be lubricated from time to time. Recently there have come into existence so-called central lubricating systems, by means of which a large number of bearings may be lubricated simultaneously from a remote point. Because of the great variation in conditions of a plurality of bearings, due to the nature of the bearings, their locations, and differences in temperature, it is not sufficient simply to pump oil through a pipe system connected with all of the bearings, as the oil will follow the easiest path, causing some bearings to be flooded and others perhaps to receive no oil. Therefore the so-called central lubricating systems, of which I am aware, are all provided at the bearings with restricted outlets whose sizes are carefully calculated, or with measuring units to measure out predetermined quantities of oil when pressure is applied at the central station and, upon the release of such pressure, to deliver such measured quantities to the bearings. If the restricted outlets are satisfactory initially, service conditions soon make them less satisfactory. The measuring units, in order to be effective, require that great care be taken in their construction, making them comparatively expensive, and as they are more or less delicate, they are apt to get out of order.

The object of the present invention is to produce a simple and novel central lubricating system in which oil is permitted to be delivered to a plurality of bearings in substantially the same manner as though simple pipe connections were employed, the flow to each bearing being regulated by a simple device at each bearing to insure effective lubrication under all conditions.

My improved regulating devices are extremely simple and are inexpensive. Therefore, viewed in one of its aspects, my invention may be said to have for its object to produce an efficient central lubricating system that shall consist of a few simple elements and thus be cheap in initial cost and not apt to get out of order in service.

Viewed in further aspect, my invention may be said to have for its object to produce a simple and novel regulator for controlling the flow of oil from a pipe to a bearing.

The regulating device that I have devised operates on the principle that the effective inlet to a bearing, upon being opened, decreases in capacity as the pressure on the oncoming oil increases, whereby a device located at a remote point from the pressure-producing device, at which point the pressure may be much less than at a point near the central station, will have a larger effective inlet, upon the application of pressure, than at the other point, so that there will be an adequate flow, and only an adequate flow, into bearings at such two points. The degree of pressure in the system is immaterial, and I am therefore enabled to connect the system directly to the usual engine lubricating pump on an automobile, providing a suitable manual valve for shutting off or permitting a flow of oil from the pump to the system.

Therefore, viewed in one of its aspects, the present invention may be said to have for its object to produce a simple and novel system for lubricating a plurality of bearings distributed about an automobile, whereby the ordinary engine lubricating pump on an automobile may be utilized effectively to lubricate such bearings.

Figure 2:
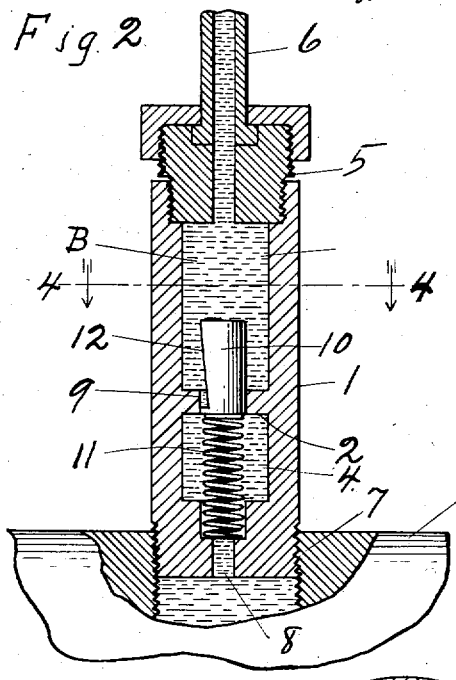
Figure 3:
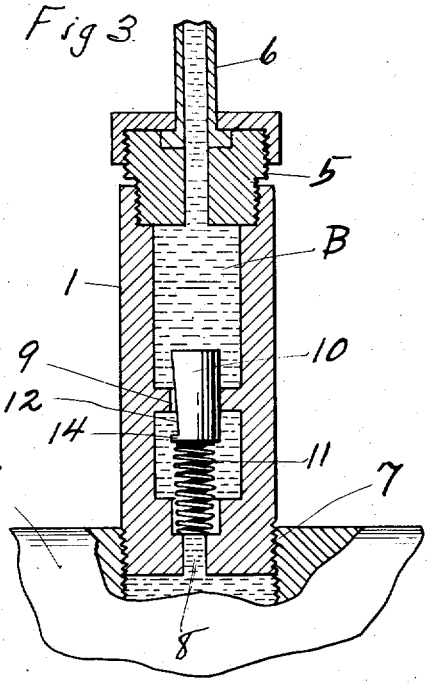

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a diagrammatic view illustrating my improved system connected to the lubricating pump of an automobile; Fig. 2 is a longitudinal central section through one of the individual regulating devices, showing the movable regulating element in a position to shut off any flow of oil into the bearing with which the device is associated; Fig. 3 is a view similar to Fig. 2, showing the inlet to the bearing to be lubricated as partially opened and Fig. 4 is a section taken on line 4—4 of Fig. 2 but on a larger scale.

Figure 4:
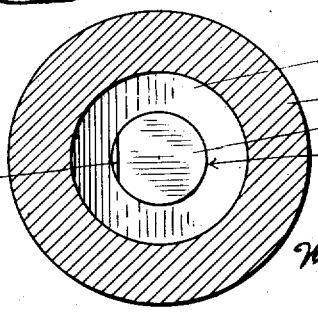

Referring to Figs. 2, 3 and 4 of the drawing, 1 represents a small cylindrical shell opened at the top and closed at the bottom; there being a transverse partition 2 in the shell to separate the interior thereof into an upper compartment 3 and a lower compartment 4. The upper end of the shell is closed by a suitable fitting 5, by means of which an inlet pipe 6 is connected with the upper chamber or compartment. The lower end of the shell has screw threads 7 or other means for securing it to a member A containing a bearing to be lubricated. Through the bottom of the shell is a discharge port 8, communicating at its upper end with the chamber or compartment 4. The partition 2 has a round hole 9 extending through the same and, fitting slidably into this opening is an elongated vertical plunger 10. In the chamber 4, underneath the plunger is a spring 11 that normally holds the plunger in a raised position. The cross-sectional area of the plunger is made slightly less at the extreme upper end than the cross-sectional area of the opening in which the plunger slides, and decreases gradually to a point near the lower end of the plunger; the lower end of the plunger being left cylindrical so as to fit the opening and prevent a transfer of oil from the upper chamber into the lower chamber in the device when the lower end of the plunger lies within the opening in the partition as shown in Fig. 2. The reduction in cross-sectional area of the plunger is shown in the drawing as being produced by flattening one side of the plunger, as indicated at 12, to form a flat face lying in a plane making a slight angle with the central longitudinal axis of the plunger; the extreme lower end 14 of the plunger being left unmutilated.

When oil is permitted to flow from the pipe 6 into the device, it fills the upper chamber 3, as indicated at B. However, as long as there is no pressure on the oil, it cannot escape past the plunger. If the oil in the inlet pipe is placed under a pre-determined pressure, the plunger is forced down until an equilibrium is established between the upward pressure of the spring and the downward pressure on the plunger. If this point of equilibrium is reached when the unmutilated lower end of the plunger is only a short distance below the bottom face of the partition, a comparatively large passage will be afforded through which the oil may flow from the upper chamber into the lower chamber. If the pressure on the oil be greater, equilibrium will not be established until the plunger has been depressed farther, thus reducing the size of the passage between the two chambers. If the pressure be great enough to force the plunger down as far as it will go, there will be only a very small passage through which the oil can flow from the upper chamber into the lower. Therefore, since the transfer of oil from the upper chamber to the lower depends both on the cross-sectional area of the passage between the chambers and the pressure on the oil, it will be seen that a series of devices may be calibrated so that substantially the same amount of oil will be transferred during a given time by each of them even though the pressures differ widely throughout the series of devices. Therefore, if in an automobile for example, one of my improved measuring devices is placed at each plurality of bearings to be lubricated, and all of the devices are connected to a single supply pipe, the various bearings may be effectively lubricated by simply forcing oil through the supply pipe at any pressure that will be sufficient to depress the plunger in the most remote device to a sufficient extent to permit oil to be transferred from the upper to the lower chamber in that device.

In Fig. 1, I have shown a series of regulating devices connected to a single supply pipe 15 which is in turn connected to the discharge pipe 16 of the usual engine lubricating pump 17. A manual valve 18 controls communication between the discharge pipe 16 and the pipe 15, so that when this valve is closed, the pump simply operates in the usual way to circulate the oil from the crank case; pipes 19 and 20 represent parts of such circulating system. Whenever it is desired to lubricate the bearings with which the regulating devices are associated, the engine being assumed to be running, so that the pump is in operation, the valve 18 is simply opened and held open for a short interval of time, the length of which will soon be learned from actual practice; whereupon the valve will again be closed and left in its closed position until another charge of lubricant is to be delivered to the bearings. When the valve 18 is opened, oil is pumped through the pipe 15 to each of the regulating devices. The plungers in the several regulating devices will adjust themselves to permit a flow of oil past them and into the bearings. This flow of oil will continue until the valve 18 is again closed, whereupon the plungers will rise and close communication between the upper and lower chambers in the several devices, thus preventing oil from draining from the system into the bearings and emptying the supply pipe of the upper chambers in the devices.

It will thus be seen that I am enabled to equip an automobile, for example, with an efficient central lubricating system, the oil for which is pumped by the engine lubricating pump that is already in use, the entire additional equipment being only simple piping and a quantity of my improved flow regulating devices that cost only a few cents each and may be screwed into the openings that ordinarily receive oil cups. It will also be seen that no effort or labor is required on the part of the user, to lubricate an entire series of bearings, except the operation of a small manual valve. Furthermore, after the system has been installed, it will operate efficiently for an indefinite period, as there are no moving parts except the small plungers and no small openings to become clogged. If any small solid particles enter one of the regulating devices, the reciprocating movements of the plunger will prevent such particles from clogging the outlet passage from the upper chamber into the lower chamber, each device being, therefore, self-closing.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. The combination with the engine lubricating pump of an automobile, of a pipe connected to the discharge side of the pump, a valve in said pipe, said pipe having a plurality of outlets to distributed bearings to be lubricated, and means associated with each outlet to close the same when said valve is closed and to open the same when said valve is opened while the pump is running, said means being constructed to reduce the effective size of said outlets in a definite relation to increase in pressure in said pipe.

2. The combination with the engine lubricating pump of an automobile, of a pipe connected to the discharge side of the pump, a valve in said pipe, said pipe having a plurality of outlets to distributed bearings to be lubricated, and means associated with each outlet to close the same when said valve is closed and to open the same when said valve is opened while the pump is running, said means being constructed to increase the effective resistance of said outlets in a definite relation to increase in pressure in said pipe.

3. A regulating device comprising a member having two chambers separated from each other by a wall having an opening therethrough, one of the chambers having an inlet and the second having an outlet, a plunger extending through and slidable in said opening, the plunger fitting said opening and serving as a valve therefor at the end toward the second chamber and being reduced in cross-sectional area for the remainder of its length, the cross-sectional area of the plunger increasing from the latter end toward the other end, and a spring acting on the plunger in a direction to push it into the first chamber far enough to cause said opening to be closed.

4. In a lubricating system for the chassis bearings of an automobile, a pump, a source of supply, a plurality of bearings, means connecting the pump with a source of supply, a conduit connecting the pump with the bearings and presenting a resistance to flow of oil and resistance means at each of said bearings to automatically compensate for differences in conduit resistance between each of said bearings and the pump.

5. In a lubricating system for the chassis bearings of an automobile, means for supplying oil under pressure, a plurality of bearings to be lubricated, a conduit connecting the supply means with the bearings and presenting a resistance to flow of oil therethrough, and resistance means at each of the said bearings to automatically compensate for differences in conduit resistance between each of said bearings and the supply means, said resistance means being constructed and arranged to cut off the flow entirely when the pressure falls below a predetermined point.

6. In a lubricating system for the chassis bearings of an automobile, means for supplying lubricant under pressure, a plurality of chassis bearings requiring lubrication and presenting varying resistances to the introduction of lubricant, a conduit connecting the supply means and the bearings, and means in the conduit near each bearing operated by the flow of lubricant therethrough to present an additional resistance to flow inversely proportional to the resistance to introduction of lubricant in to the adjacent bearing, whereby the total resistance to flow from the supply means to each bearing will be substantially the same as the total resistance to flow to each other bearing, substantially regardless of the variations in resistance to flow presented by the bearings themselves, and means in each flow compensating device to cut off communication therethrough entirely when the lubricant pressure drops below a certain point.

7. In a lubricating system for the chassis bearings of an automobile a plurality of bearings, a source of lubricant under pressure, a branched conduit connected to said source and having an outlet at each of said bearings, a valve in said conduit controlling communication between the source and the bearings, means for closing said outlets upon the closing of said valve and means operable by said pressure upon the opening of said valve, to open and thereafter to restrict said outlets in proportion to the pressure at each outlet.

8. In a lubricating system for the chassis bearings of an automobile a lubricant reservoir, a pump connected to said reservoir, a plurality of devices to be lubricated and located at varying distances from the pump, a conduit system connected to the pump and having an outlet at each of the said devices and presenting a greater resistance to flow from the pump to one of said devices than it presents to flow from the pump to another of said devices, and an automatically adjusted flow control device in each of a plurality of said outlets to compensate for the difference in conduit resistance between each of said bearings and the pump.

9. In a lubricating system a lubricant pump, a plurality of bearings at varying distances from said pump, a branched conduit leading from the pump to the bearings, a restricted passageway in said branches and pressure operated means to vary the cross sectional area of the passageway in inverse proportion to the pressure.

10. A drip plug for lubricating systems, comprising a member having a chamber therein and having an inlet and an outlet and means for connecting said outlet to a bearing, a valve in said chamber, normally closing communication between the inlet and the outlet but adapted to be displaced by pressure of lubricant entering said inlet, a flow resistance in said drip plug and pressure operated means to vary said resistance in proportion to the degree of pressure.

11. A drip plug for lubricating systems, comprising a member having a passageway therethrough and an inlet and an outlet, a member in said passageway normally serving as a valve to close communication between the inlet and the outlet but adapted to be moved toward the outlet and opened by pressure of lubricant entering said inlet, said valve member having a part cooperating with a portion of the walls of the passageway to present an increasing resistance to flow of lubricant as the valve member is moved toward said outlet.

12. In a device of the class described, a body member having a bore therethrough and an inlet and an outlet, an external screw thread at the outlet end of said body member whereby it may be attached to a bearing, screw threaded means at the inlet end of said member for attaching a lubricant conduit thereto, a filler member having a tapered portion and coacting with a portion of the walls of said bore to form a highly restricted passageway, a spring pressed valve member between said tapered portion and said outlet, and a spring between said valve member and said outlet normally tending to hold said valve in closed position.

13. A flow control fitting for lubricating systems comprising a body member having an inlet and an outlet connected by a bore, a filler member in said bore having a tapered portion and defining with an integral portion thereof a highly restricted passageway, normally closed valve means within said bore, one of the elements of said valve being integral with said filler member.

In testimony whereof, I sign this specification this 30 day of March, 1927.

GEORGE L. MOORE.